United States Patent
Singh et al.

(10) Patent No.: US 12,095,799 B2
(45) Date of Patent: Sep. 17, 2024

(54) CLOUD ACCESS SECURITY BROKER DETERMINING RISK SCORE OF CLOUD APPLICATIONS BASED ON SECURITY ATTRIBUTES

(71) Applicant: Zscaler, Inc., San Jose, CA (US)

(72) Inventors: Davinder Pal Singh, Punjab (IN); Rahul Kumar, Chandigarh (IN); Ankit Kumar, Delhi (IN); Santhosh Kumar, Bengaluru (IN); Narinder Paul, Sunnyvale, CA (US); Vairavan Subramanian, Mountain View, CA (US)

(73) Assignee: Zscaler, Inc., San Jose, CA (US)

(*) Notice: Subject to any disclaimer, the term of this patent is extended or adjusted under 35 U.S.C. 154(b) by 199 days.

(21) Appl. No.: 17/467,679

(22) Filed: Sep. 7, 2021

(65) Prior Publication Data

US 2021/0409441 A1    Dec. 30, 2021

Related U.S. Application Data

(63) Continuation-in-part of application No. 16/833,830, filed on Mar. 30, 2020, now Pat. No. 11,582,261.

(30) Foreign Application Priority Data

Jul. 26, 2021    (IN) .............................. 202111033423

(51) Int. Cl.
*H04L 29/06*    (2006.01)
*H04L 9/40*    (2022.01)

(52) U.S. Cl.
CPC ........ *H04L 63/1433* (2013.01); *H04L 63/166* (2013.01); *H04L 63/20* (2013.01)

(58) Field of Classification Search
CPC ... H04L 63/20; H04L 63/0209; H04L 63/101; H04L 63/123; H04L 63/145; H04L 63/14
USPC ............................................................. 726/1
See application file for complete search history.

(56) References Cited

U.S. PATENT DOCUMENTS

| | | |
|---|---|---|
| 8,185,510 B2 | 5/2012 | Chaudhry et al. |
| 8,286,239 B1 | 10/2012 | Sutton |
| 8,429,111 B1 | 4/2013 | Kailash et al. |
| 8,478,708 B1 | 7/2013 | Larcom et al. |
| 8,713,674 B1 | 4/2014 | Geide |
| 8,869,259 B1 | 10/2014 | Udupa et al. |
| 8,887,249 B1 | 11/2014 | Schekochikhin et al. |
| 9,152,789 B2 | 10/2015 | Natarajan et al. |
| 9,154,475 B1 | 10/2015 | Kailash et al. |

(Continued)

*Primary Examiner* — Longbit Chai
(74) *Attorney, Agent, or Firm* — Baratta Law PLLC; Lawrence A. Baratta, Jr.; Ryan Odessa

(57) ABSTRACT

Systems and methods include identifying a cloud application; performing one or more automated scripts to determine a first set of attributes of the cloud application; obtaining a second set of attributes of the cloud application based on a manual analysis; obtaining weighting factors for the first set of attributes and the second set of attributes; determining a risk score of the cloud application based on the first set of attributes and the second set of attributes and the associated weighting factors; and displaying the risk score of the cloud application. The steps can further include enforcing security policies for the cloud application based on the risk score, such as via one of a cloud-based system and a Cloud Access Security Broker (CASB) system.

20 Claims, 9 Drawing Sheets

(56) References Cited

U.S. PATENT DOCUMENTS

| | | |
|---|---|---|
| 9,473,537 B2 | 10/2016 | Sinha et al. |
| 9,609,015 B2 | 3/2017 | Natarajan et al. |
| 9,953,231 B1 * | 4/2018 | Medina, III ........... G06V 40/45 |
| 10,142,362 B2 | 11/2018 | Weith et al. |
| 10,225,740 B2 | 3/2019 | Bansal et al. |
| 10,419,477 B2 | 9/2019 | Desai et al. |
| 10,498,750 B2 | 12/2019 | Bansal et al. |
| 10,511,607 B2 | 12/2019 | Bansal et al. |
| 10,592,938 B2 * | 3/2020 | Hogg ................. G06Q 30/0641 |
| 10,749,907 B2 | 8/2020 | Sinha et al. |
| 2017/0359220 A1 | 12/2017 | Weith et al. |
| 2019/0081981 A1 | 3/2019 | Bansal et al. |
| 2020/0077265 A1 | 3/2020 | Singh et al. |
| 2020/0320192 A1 | 10/2020 | Ma et al. |
| 2021/0004726 A1 | 1/2021 | Shang et al. |

\* cited by examiner

CLOUD ACCESS SECURITY BROKER DETERMINING RISK SCORE OF CLOUD APPLICATIONS BASED ON SECURITY ATTRIBUTES

CROSS-REFERENCE TO RELATED APPLICATIONS

The present disclosure is a continuation-in-part of U.S. patent application Ser. No. 16/833,830, filed Mar. 30, 2020, and entitled "Cloud access security broker systems and methods via a distributed worker pool," the contents of which are incorporated by reference in their entirety.

FIELD OF THE DISCLOSURE

The present disclosure relates generally to networking and computing. More particularly, the present disclosure relates to Cloud Access Security Broker (CASB) systems and methods determining risk score of cloud applications based on security attributes.

BACKGROUND OF THE DISCLOSURE

Traditionally, before the cloud, corporate or enterprise resources were fully under the control of Information Technology (IT) administration ("admins"). That is, sensitive enterprise data was located within a network under IT admin control with perimeter defenses. Here, IT admins have full control of access privileges, activity, etc. As is well-known, enterprises are moving their IT infrastructure to the cloud for a variety of cloud services (Software-as-a-Service (SaaS)) for email (e.g., Office 365, Gmail, etc.), file storage (OneDrive, Dropbox, Box, Google Drive, SharePoint, etc.), document preparation and content collaboration (e.g., Office 365, Google Docs, etc.), Customer Relationship Management (CRM) (e.g., Salesforce, etc.), and the like. Here, enterprise IT admins no longer have the same level of control of enterprise resources, i.e., content is stored in the cloud, and IT simply does not have the same level of control as before.

A Cloud Access Security Broker (CASB) is an on-premises system or cloud-based service between cloud service users and cloud applications. The CASB is configured to monitor activity and enforce security policies, such as monitoring user activity, warning administrators about potentially hazardous actions, Data Loss Prevention (DLP), enforcing security policy compliance, automatically preventing malware, etc. For example, a CASB system, either on-premises or as a cloud-based service, can scan through a large number of files in a cloud or SaaS application, e.g., Office 365, Dropbox, Box, Google Drive, Salesforce, etc. This places tremendous loads on traditional CASB systems, resulting in latency, inability to properly scan all files, poor user experience, etc. In effect, an objective of a CASB system or scanner is to provide IT admin with control as if the enterprise resources were fully under the IT admin's control as before the cloud.

Again, the goal of IT is to have similar control of cloud-based deployments as was with conventional deployments. Towards this goal, there is a need to understand the risk associated with cloud applications.

BRIEF SUMMARY OF THE DISCLOSURE

The present disclosure relates to Cloud Access Security Broker (CASB) systems and methods determining risk score of cloud applications based on security attributes. In particular, the present disclosure analyzes and determines risk associated with cloud applications. Risk score enables customers (organization) to wisely choose which cloud applications fit an organization's security requirement and keep IT up-to-date with the latest security standards, vulnerabilities, and breaches. The present disclosure analyzes cloud application based on multiple security attributes and derives a risk score. Also, using a cloud-based security system, cloud applications are discovered and analyzed based on traffic logs. The cloud applications are ranked and score to provide customers with ongoing visibility into cloud use, Shadow IT, and the risk Shadow IT poses to organizations. It allows IT Administrators to easily identify risky, unsanctioned apps in use by their users. Shadow IT helps identify which apps are being used and what each app's risk level is.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIGS. 1A and 1B or the like;

FIG. 3 is a block diagram of a mobile device which may be used in the cloud-based system of FIGS. 1A and 1B or the like;

FIG. 9 is a flowchart of a process for determining risk associated with cloud applications, such as via the cloud-based system, the CASB, and the like.

DETAILED DESCRIPTION OF THE DISCLOSURE

Again, the present disclosure relates to Cloud Access Security Broker (CASB) systems and methods determining risk score of cloud applications based on security attributes. In particular, the present disclosure analyzes and determines risk associated with cloud applications. Risk score enables customers (organization) to wisely choose which cloud applications fit an organization's security requirement and keep IT up-to-date with the latest security standards, vulnerabilities, and breaches. The present disclosure analyzes cloud application based on multiple security attributes and derives a risk score. Also, using a cloud-based security system, cloud applications are discovered and analyzed based on traffic logs. The cloud applications are ranked and score to provide customers with ongoing visibility into cloud use, Shadow IT, and the risk Shadow IT poses to organizations. It allows IT Administrators to easily identify risky, unsanctioned apps in use by their users. Shadow IT helps identify which apps are being used and what each app's risk level is.

Example Cloud-Based System Architecture

Figure 1A:
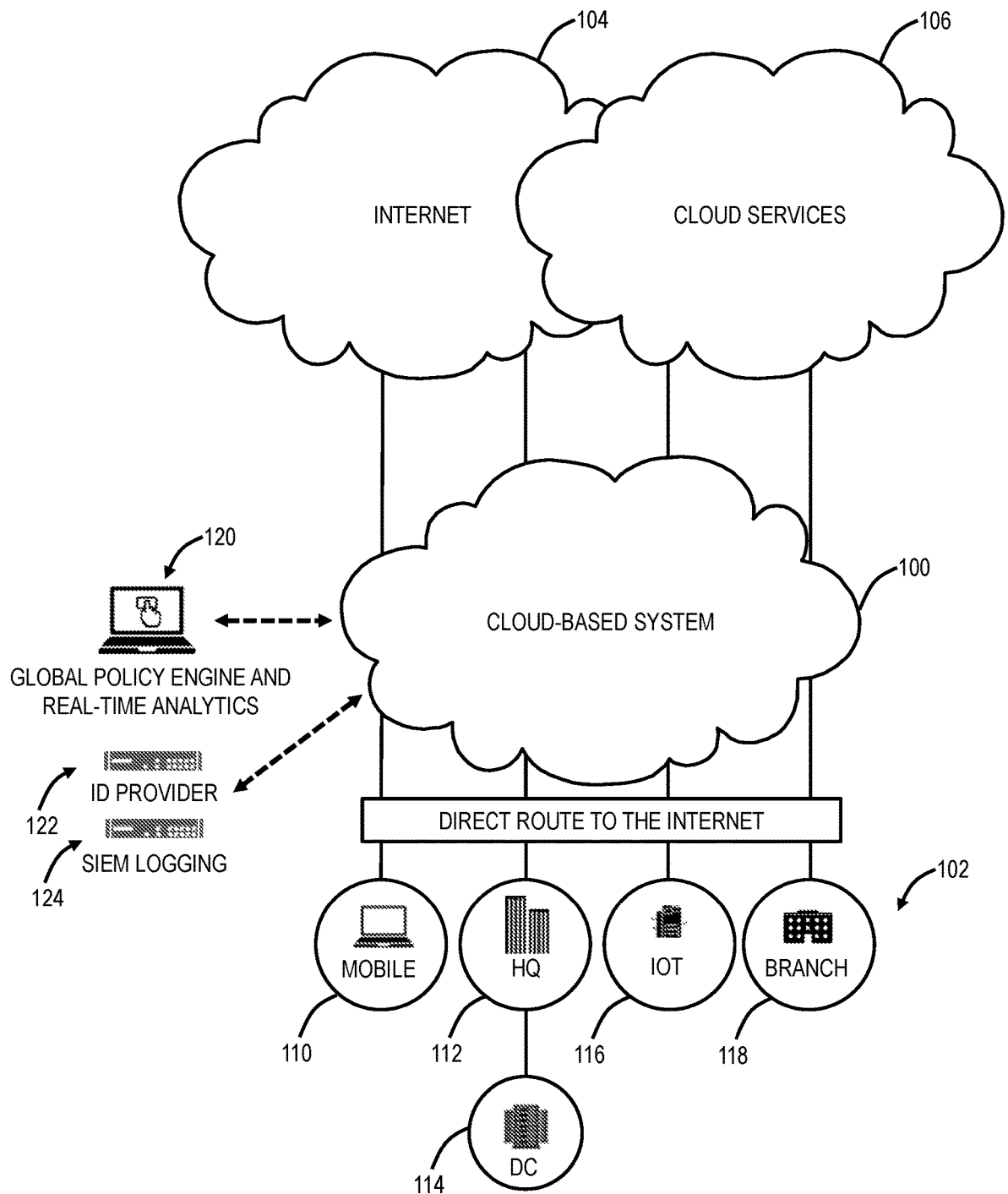
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
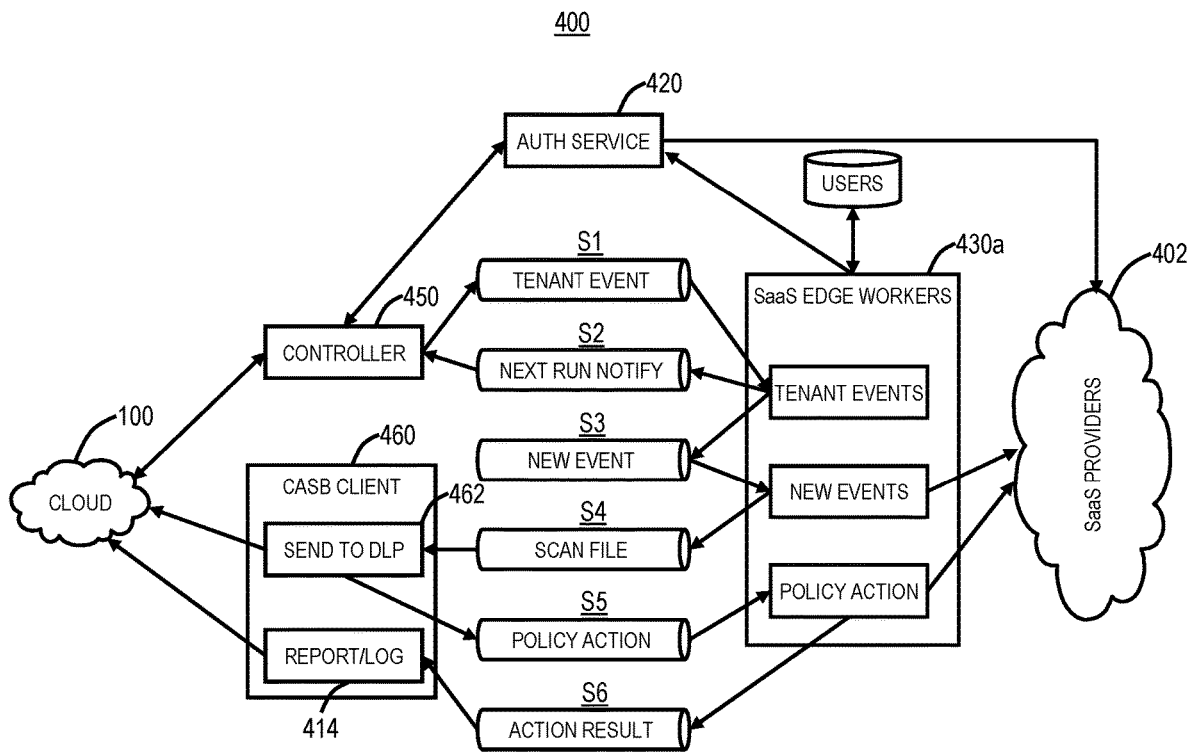
FIG. 5 is a functional block diagram of filing crawling of the SaaS provider with the CASB system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes— they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
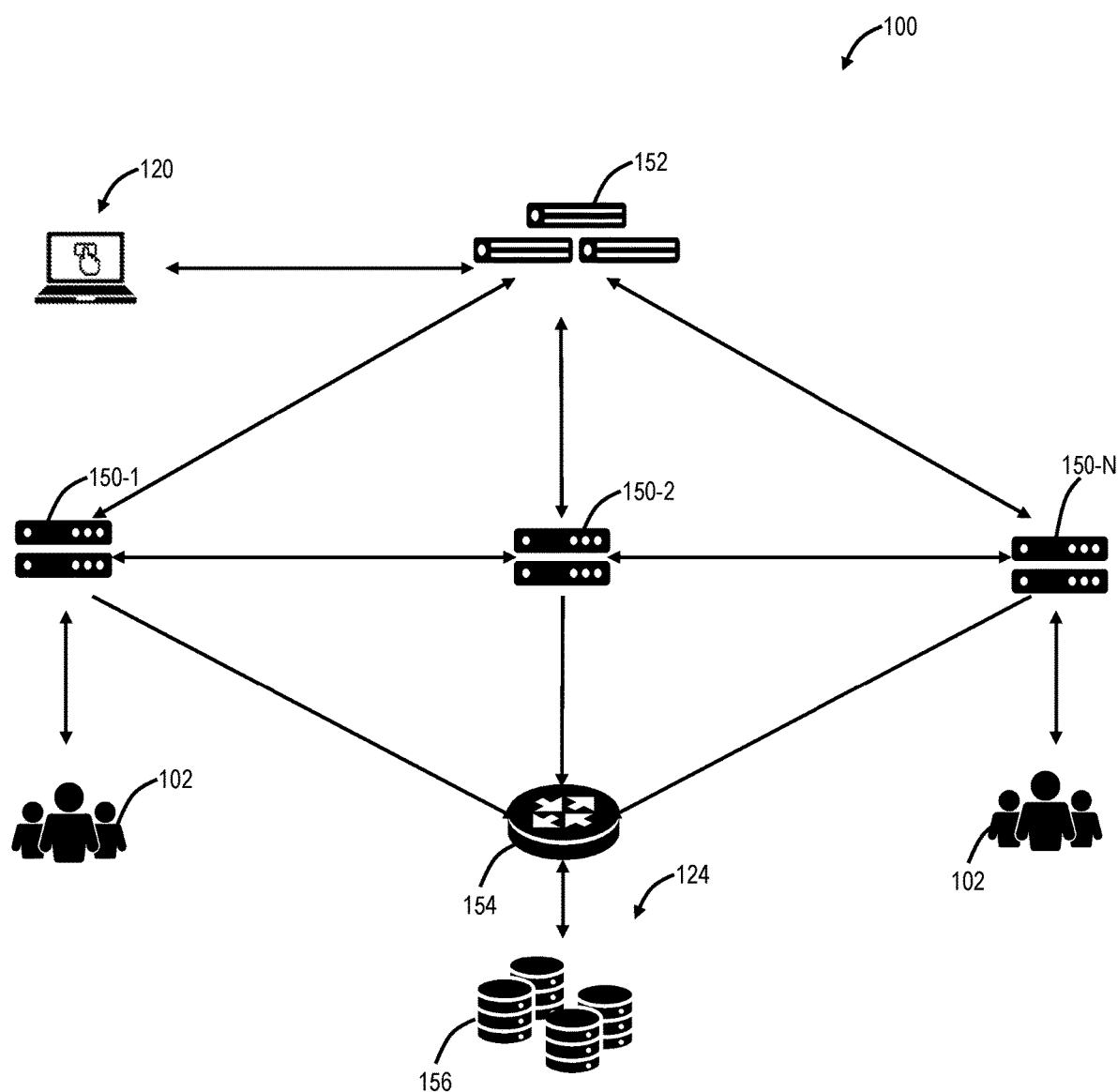
FIG. 1B is a network diagram of an example implementation of the cloud-based system.
Figure 4:
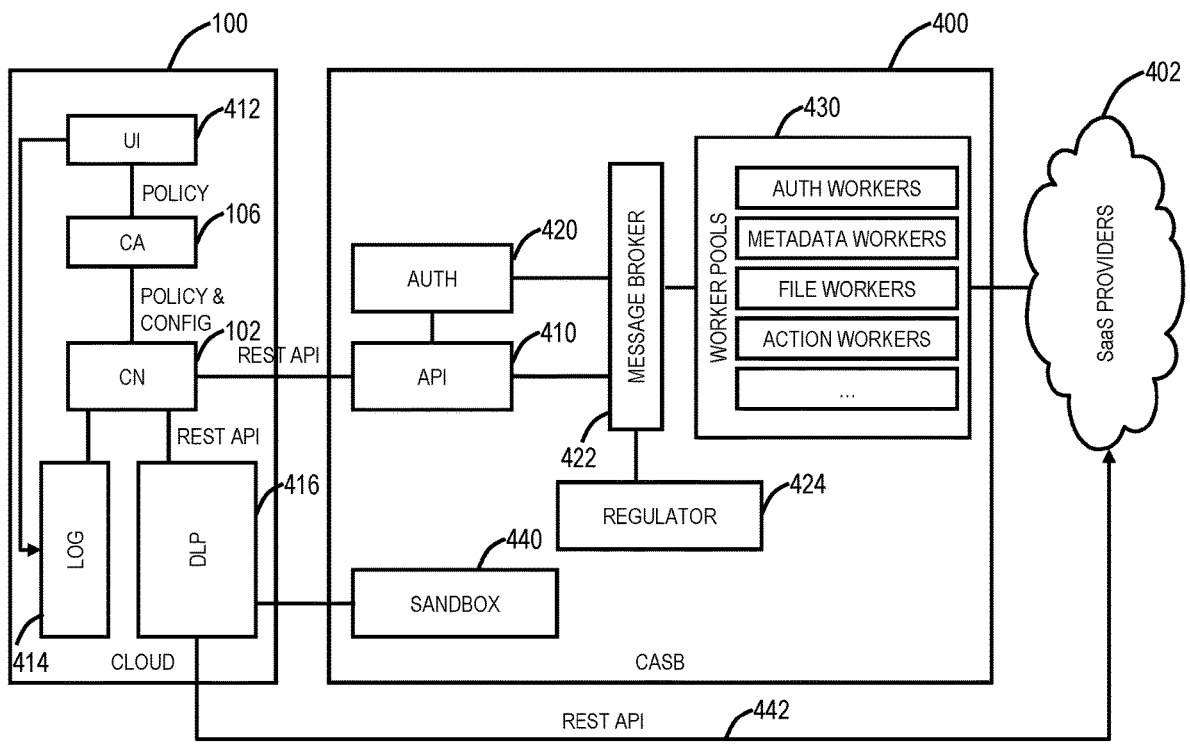
FIG. 4 is a network diagram of a CASB system.

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 2:
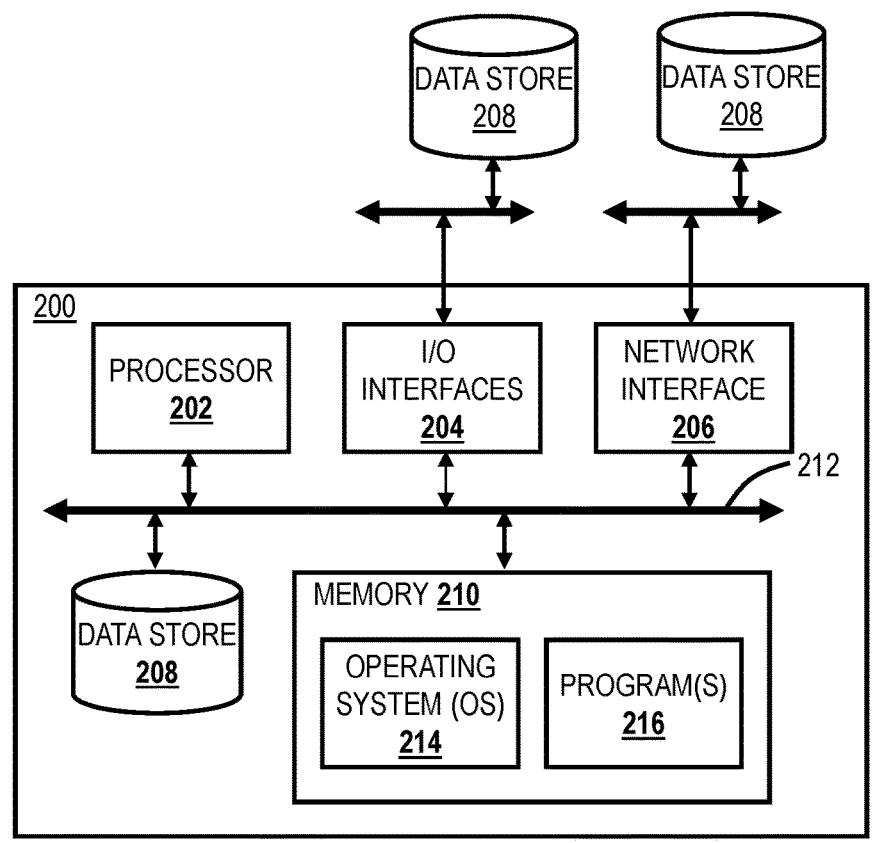

FIG. 2 is a block diagram of a server 200, which may be used in the cloud-based system 100, in other systems, or standalone. For example, the cloud nodes 102 and the central authority nodes 106 may be formed as one or more of the servers 200. The server 200 may be a digital computer that, in terms of hardware architecture, generally includes a processor 202, Input/Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Example User Device Architecture

Figure 3:
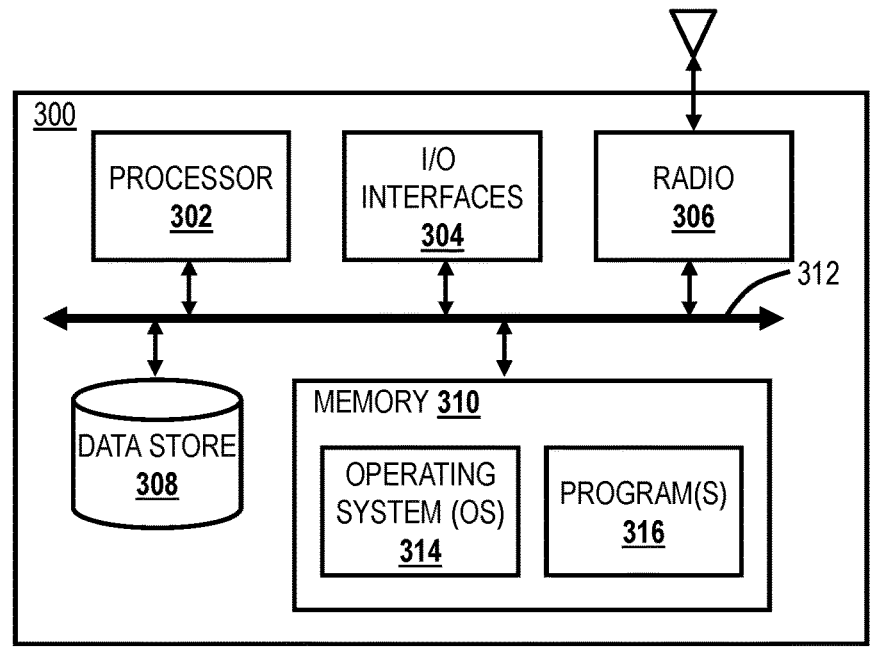

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

CASB System

FIG. 4 is a network diagram of a CASB system 400. The CASB system 400 can be located between the cloud-based system 100 and one or more SaaS providers 402. As described herein, the SaaS providers 402 can be referred to as cloud providers, cloud service providers, service providers, etc. Examples of the providers 402 include, without limitation, Office 365, Dropbox, Box, Google Drive, Salesforce, etc. That is the providers 402 can provide cloud services for enterprises related to file sharing, document management, email, collaboration, scheduling, timekeeping, financial, etc. The key point is the enterprise IT is moving from local applications hosted and maintained within the enterprise network to cloud-based solutions where the data is located off-site, in the providers 402.

The CASB system 400 can be implemented in a cloud-based system, such as using the architecture of the cloud-based system 100. The CASB system 400 can be implemented in a private cloud, a public cloud, or a hybrid cloud. Alternatively, the CASB system 400 can be one or more servers 200 that can be located on-premises with an enterprise, off-premises, etc. Even further, the CASB system 400 can be collocated with the SaaS providers 402. That is, various architecture implementations are contemplated. Further, the CASB system 400 contemplated both operations with the cloud-based system 100, operating as a distributed security system, as well as independent operation (i.e., with the components of the cloud-based system 100 omitted in FIG. 4, and with the functionality incorporated in the CASB system 400 itself).

The objective of the CASB system 400 is to provide enterprise IT control over data (resources) in the SaaS providers 402. Note, as described herein, the enterprise can be referred to as a tenant of the provider 402. The CASB system 400 is configured to operate as a distributed file crawler for files associated with a particular tenant. The CASB system 400 can both provide a report based on the file crawling as well as implement policy actions based on policy configuration.

The CASB system 400 includes one or more APIs 410, such as a Representational state transfer (REST) API. In an embodiment, the APIs 410 connect to the cloud-based system 100, such as one of the cloud nodes 102. Here, a user can interact with the CASB system 400 via a User Interface (UI) 412 through a central authority node 106. Additionally, the cloud node 102 can connect to a log 414, such as a data store that stores statistics and transactions, for reporting. The cloud node 102 can also connect to a DLP engine 416 for data leakage protection through the CASB system 400. Here, the CASB 400 can be used to identify content, files, etc. that match sensitive data in a DLP dictionary. The user can provide policy and configuration via the UI 412.

Again, the CASB system 400 can be deployed without the cloud-based system 100. Here, the API 410 can connect directly to the UI 412, and the log 414 and the DLP engine 416 can be incorporated directly in the CASB system 400, or in an external system.

The CASB system 400 includes an authentication provider 420 that is configured to perform authentication of the tenant with the SaaS providers 402. The APIs 410 and the authentication provider 420 connect to a message broker 422, which is configured to interact between the APIs 410, the authentication provider 420, and a plurality of workers 430. A regulator 424 is connected to the message broker. The message broker 422 is a pipeline where job tickets are queued for consumption by the workers 430.

In an embodiment, the authentication provider 420, a controller for the APIs 410, the regulator 424, and the workers 430 are Java Spring services, and other embodiments are also contemplated. The message broker 422 can be a queuing service, such as using Apache Kafka, Microsoft EventHub, or other embodiments. The API controller is a liaison service that interfaces between the CASB system 400 and the cloud-based system 100.

With respect to the authentication provider 420, customer information, including tokens and credentials are not stored permanently or persisted. Also, the CASB system 400 is not tied specifically to a particular SaaS provider 402. That is, the CASB system 400 is configured to operate with multiple, different SaaS providers 402. This is accomplished through customized APIs and configured of the workers 430. Each SaaS provider 402 can have a different set of APIs and functionality.

The workers 430 are connected to the SaaS providers 402 and are dedicated to performing particular tasks. In a sense, the plurality of workers 430 are organized in a pool of workers, and tasks are assigned between the workers 430. The CASB 400 can include a sandbox 440 that can be connected to the DLP engine 416, and the DLP engine 416 can also include a REST API 445 connection to the SaaS providers 402. Note, the sandbox 440 can be included in the CASB system 400, or it can be an external system. The sandbox 440 is configured to execute files, open files, etc. in a safe environment to analyze whether the files are malicious or not.

The worker pool is a collection of workers 430 that interact with the SaaS provider 402 and perform specific tasks. The pool of workers 430 enables the CASB system 400 to operate efficiently in a distributed nature. The workers 430 are assigned tasks from various queues, via the message broker 422 and the regulator 424. Thus, the workers 430 can operate akin to an assembly line, and there can be handoffs between workers 430. For example, the workers 430 can include authentication workers to authenticate users, tenants, etc., metadata workers to analyze file or content metadata, file workers to scan/analyze files, action workers to perform various policy-related actions, and the like.

The workers 430 can logically be viewed as contract workers in a factory, on an assembly line, etc. The workers 430 are provided specific instructions in a job ticket. The job ticket has information on what job to be performed, where to get the inputs, and where to send the outputs. Every worker 430 also knows what to do when something goes wrong.

The regulator 424 is like the SCADA (Supervisory Control and Data Acquisition) in a control system architecture. The regulator 424 monitors the performance of all the workers 430 and controls the overall system for optimum throughput.

Job Ticket Example

Again, the message broker 422 assigns jobs to the workers 430. Here is an example of a job ticket for an example job:

```
{
TenantID : 123456
TransactionID : 111111
JobType : GetTenantUsers
Run ID : 1
SaaSProvider : Google Drive
...
...
...
}
```

Design Constraints

Again, each different SaaS provider 402 can have a different set of APIs and functionality. The CASB system 400 is configured to interface with a plurality of different SaaS providers 402. The log 414 can be configured to store changes/events for an entire organization, including on a per user basis.

The APIs between the CASB 400 and the SaaS providers 402 may be limited, e.g., throttled by the SaaS providers 402. As such, there is an initial baseline crawl (i.e., a first-run) where the CASB system 400 has to crawl and scan all files in the SaaS provider 402. This initial baseline crawl is performed efficiently and is synchronized with the DLP engine 416. After the baseline crawl, subsequent crawls are performed incrementally, namely through files that changed since the previous crawl. For example, the first run can be referred to as run one, and each incremental crawl is run X, which only scans and crawls files that have changed since run X−1. In an embodiment, the period of incremental calls is once a day. Of course, other periods are also contemplated.

File Crawl

The SaaS providers 402 generally provide two ways to crawl through the files for a tenant, namely crawling based on organization-wide file activity or a change log and crawling based on a pseudo-breadth-first traversal. The file activity or a change log enables crawling based on file changes. The pseudo-breadth-first traversal is crawling based on snapshots.

FIG. 5 is a functional block diagram of filing crawling of the SaaS provider 402 with the CASB system 400. Specifically, FIG. 5 illustrates functionality associated with file crawling in the SaaS provider 402 by the CASB 400. The CASB 400 includes a controller 450, such as the message broker 422 and the regulator 424. The controller 450 can communicate with the cloud-based system 100 and the authentication provider 420. The authentication provider 420 can communicate with the SaaS providers 402. The CASB 400 can also include a CASB client 460 that includes a worker for DLP 462 and the log 414. In the example of FIG. 5, there are edge workers 430a that interface between the authentication provider 420, the SaaS provider 402, the controller 450, and the CASB client 460. The objective of the edge workers 430a is to perform file crawling of the SaaS providers 402. In an embodiment, the SaaS providers 402 can be file storage providers, such as, for example, Office 365 (SharePoint), Box, DropBox, etc.

For illustration, an example operation is described in FIG. 5. There is a tenant event (S1) from the controller 450 to the edge worker 430a. The next run notification (S2) is provided from the edge worker 430a after all files are crawled in the run. The edge worker 430a notes a new event (S3) with file meta-data, the edge worker 430a fetches file details and provides file for scanning (S4) which is sent to DLP 562 for scanning and analysis. A policy action (S5) can be the result of the DLP 562 and provided to the edge worker 430a. The edge worker 430a can implement the policy action in the SaaS provider 402 and provide the result (S6) for the log 414. For example, a policy action can be to delete a file, quarantine a file, flag a file, etc.

Crawling Based on a Change Loci

Figure 6:
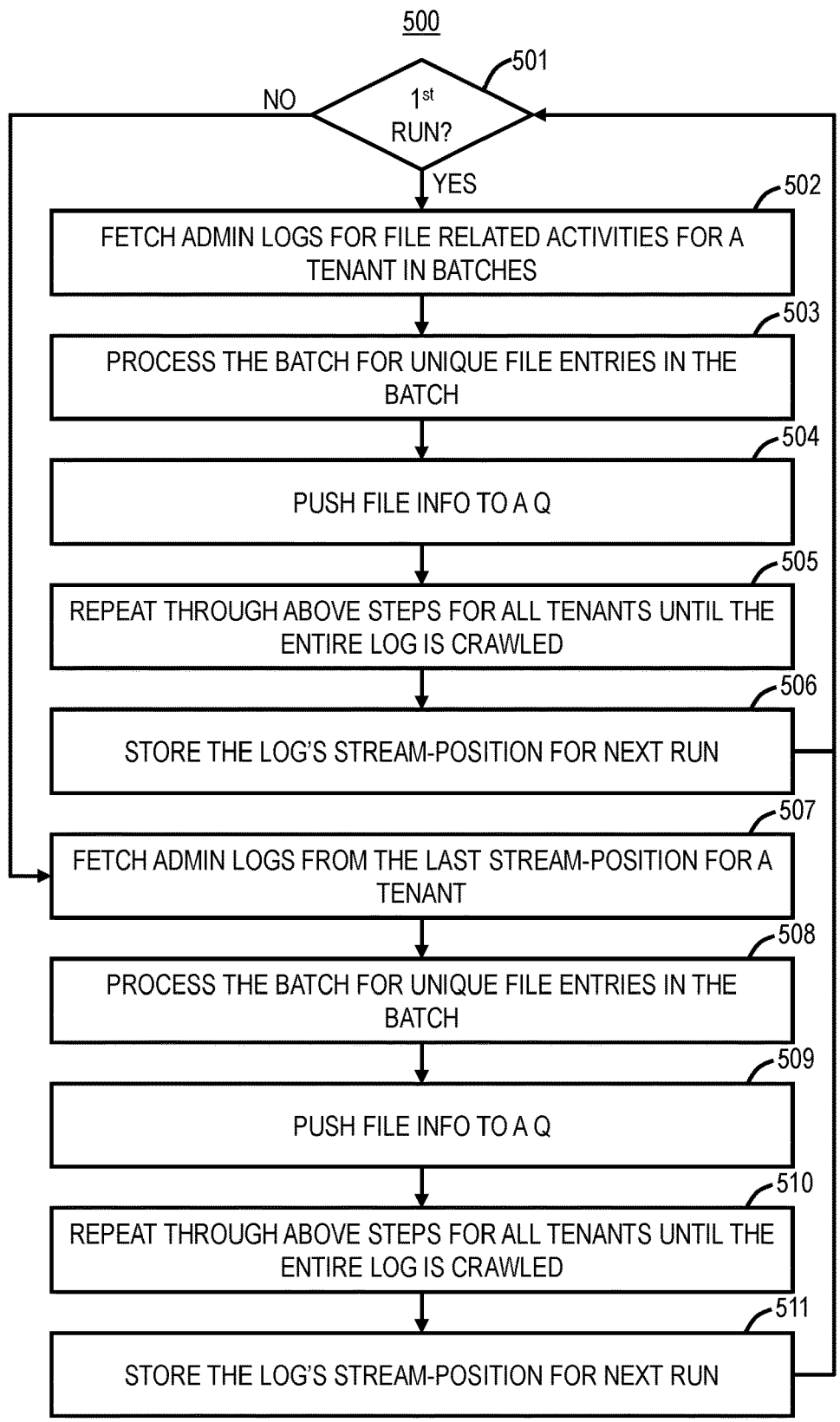
FIG. 6 is a flowchart of a file crawling process based on a change log.

FIG. 6 is a flowchart of a file crawling process 500 based on a change log. The file crawling process 500 contemplates implementation by the CASB system 400 to crawl the SaaS provider 402. The file crawling process 500 includes, for a first run (step 501), fetching admin logs for file-related activities for a tenant in batches (step 502), processing the batch for unique file entries in the batch (step 503), pushing the file info into a queue (Q) (step 504), repeating steps 503, 504 until the entire log is crawled (step 505), and storing the log's stream-position for a next Run (step 506).

For a run X (step 501) where X is an integer greater than 1, the file crawling process 500 includes, fetching admin logs from the last stream-position for a tenant (step 507), processing the batch for unique file entries in the batch (step 508), pushing file info to a queue (Q) (step 509), repeating through above steps 508, 509 for all tenants until the entire log is crawled (step 510), and storing the log's stream-position for a next Run (step 511).

Crawling Based on the Breadth-First Traversal

Figure 7:
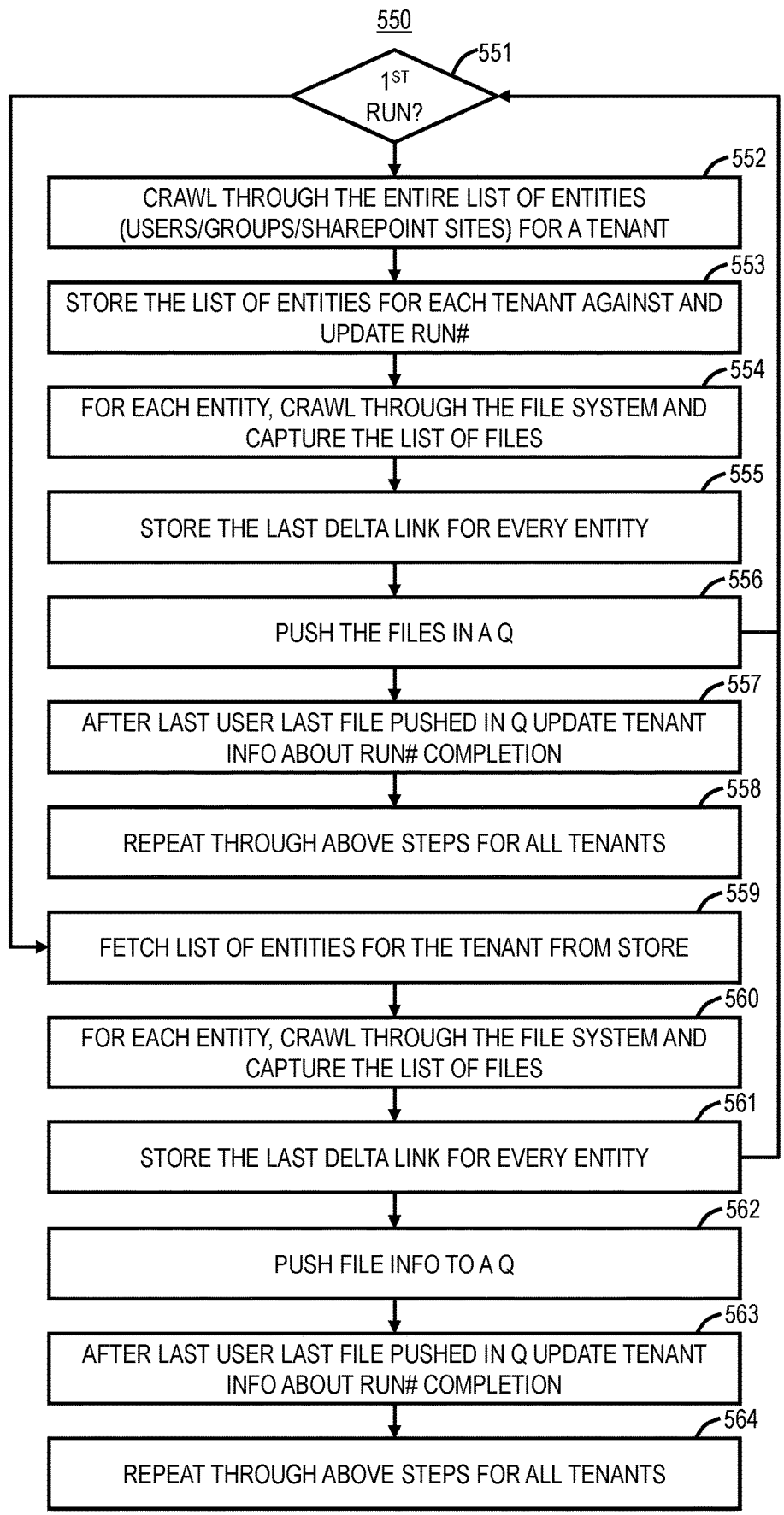
FIG. 7 is a flowchart of a file crawling process based on breadth-first traversal.

FIG. 7 is a flowchart of a file crawling process 550 based on breadth-first traversal. The file crawling process 550 contemplates implementation by the CASB system 400 to crawl the SaaS provider 402. For example, some SaaS providers 402 may not maintain a change log for a tenant, but instead, provide a snapshot of a user's filesystem and then a change log for every user. The file crawling process 500 includes, for a first run (step 551), crawling through the entire list of entities (Users/Groups/SharePoint Sites) for a tenant (step 552), and storing the list of entities for each tenant against and update Run # (step 553). For each entity, the file crawling process 550 includes, crawling through the File System and capturing the list of files (step 554), storing the last delta link for every entity (step 555), and pushing the files in a queue (Q) (step 556). The file crawling process 550 includes, after the last user, the last file pushed in the queue (Q), updating tenant info about Run # completion (step 557), and repeating through the above steps for all tenants (step 558).

For run X (step 551) where X is an integer greater than 1, the file crawling process 550 includes fetching a list of entities for the tenant from store (step 559), for each entity, crawling through the File System and capture the list of files (step 560), storing the last delta link for every entity (step 561), pushing the files in a queue (Q) (step 562), after last user last file pushed in the queue (Q), updating tenant info about Run # completion (step 563), and repeating through above steps for all tenants (step 564).

Flow Diagram

Figure 8:
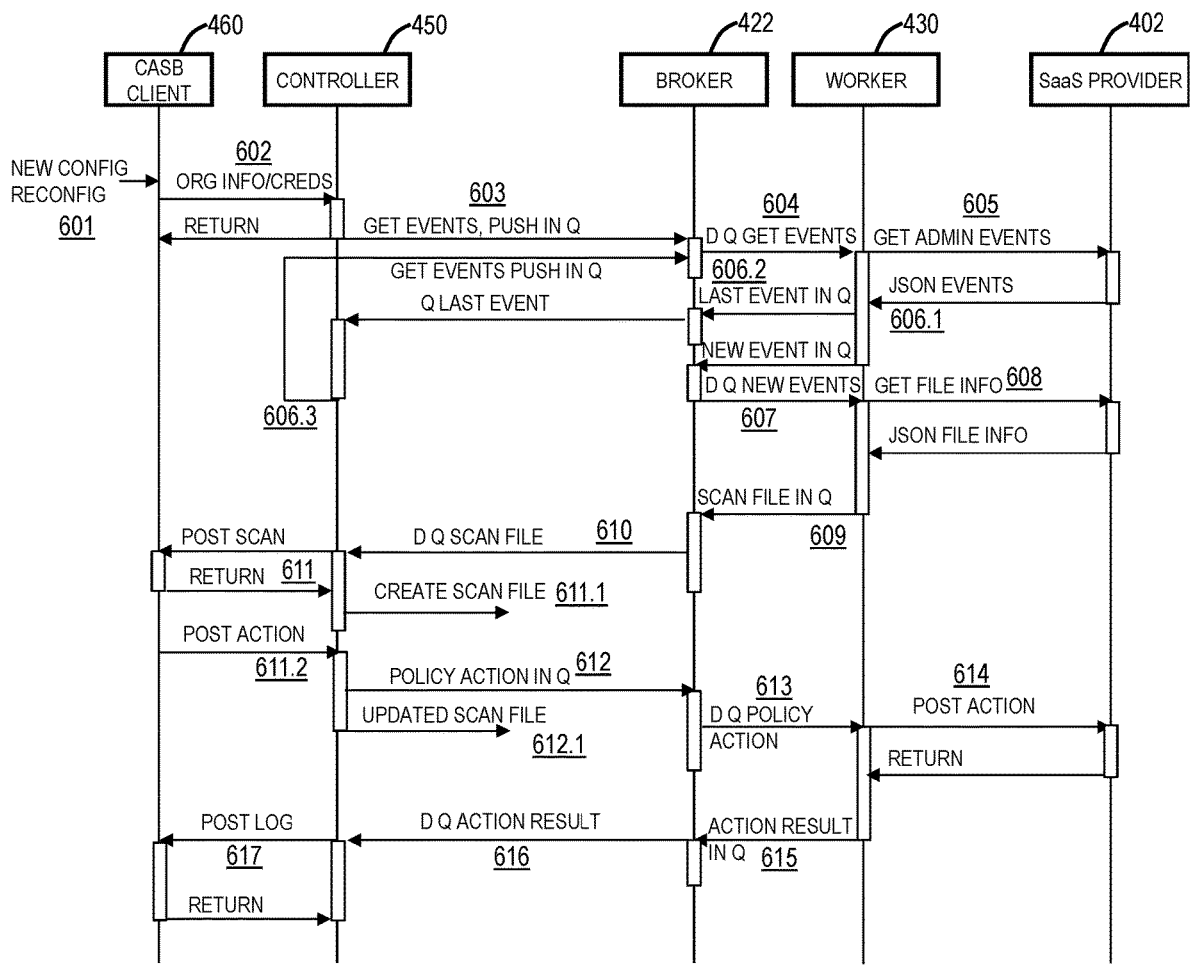
FIG. 8 is a flow diagram of example operations between the CASB client, the controller, the message broker, a worker, and the SaaS provider.

FIG. 8 is a flow diagram of example operations between the CASB client 460, the controller 450, the message broker 422, a worker 430, and the SaaS provider 402. A new configuration or reconfiguration is provided, via the CASB client 460, the cloud-based system 100, etc. (step 601), and organization (tenant) information and credentials are provided to the controller 450 (step 602). The controller 450 gets events and pushes them in a queue (Q) (step 422). The message broker 422 is configured to dequeue (D Q) the events and assign it to the worker 430 (step 604). The worker 430 is configured to interact with the SaaS provider 402 to get admin events (step 605), which are provided as JavaScript Object Notation (JSON) events (step 606.1). The process is continued until the queue is emptied, the last event in the queue (step 606.2, 606.3).

The worker 430 can add new events in the queue, and the broker 422 can dequeue the new events when assigning back to a worker 430 (step 607). The worker 430 gets file info (step 608) and receives JSON file info from the SaaS provider 402. The worker 430 can scan each file in the queue (step 609), provide results to the controller 450, which dequeues the scanned file (step 610).

The controller 450 can provide results of the scan to the CASB client 460, which returns information (step 611). The controller 450 can create a scan file (step 611.1) and receive a post-action (step 611.2) from the CASB client 460. For example, the CASB client 460 may perform DLP, and the action can be allow, delete, quarantine, etc. The controller 450 can implement the policy action in the queue (step 612), the brokers 422 can dequeue the policy action (step 613) and assign the action to the worker 430 which posts the action in the SaaS provider (step 614). The worker 450 can provide the action result in a queue (step 615), the broker 422 can dequeue the action results (step 616) and post the action result in the log (step 617).

Risk Score

The present disclosure determines a risk score of cloud applications. Enterprise IT can use this metric to determine the appropriate application usage. The method includes automated scripts as well as manual analysis. The risk criteria include one or more risk calculating and weighting factors. The method further includes the steps of calculating risk scores for the classified risk criteria, combining the calculated risk scores to obtain a total risk score, assigning a qualitative value to the total risk score, and reporting the total risk score. The reported total risk score can be used to enforce security policies based on the value of the risk scores.

List of Risk Factors

The following table illustrates example security attributes, score values, methodology for a risk score calculation, and whether the security attribute is analyzed in an automated or manual manner. Those skilled in the art will recognize these are example attributes and various combinations of these are contemplated.

A cloud application is abbreviated as "app" herein.

| Security Attribute | Score Value | Methodology for Risk Score Calculation | Automated/ Manual |
|---|---|---|---|
| SSL Usage | 0 or 10 | Check if the app uses Secure Sockets Layer (SSL) certificate for encryption or not. If yes, score 0 otherwise 10 Send requests with all Transport Layer Security (TLS) versions and then observe the response from the server. | Fully Automated |
| Weak SSL Encryption | 0 or 5 | It is basically a check of Weak ciphers which are generally known as encryption/decryption algorithms that use key sizes that are less than 128 bits (i.e., 16 bytes . . . 8 bits in a byte) in length. If an app is found using weak ciphers, rate as 5 otherwise 0. | Fully Automated |
| Third Party Data Sharing | 0 or 10 | Cloud apps generally share or sell user data. So, it is a security risk. Considering this impact in mind, a score of 10 is provided if an app is found to be involved in these activities. Otherwise, the score is 0. | Automated Result required further manual evaluation |
| Advertisements | 0 or 5 | Many cloud apps show ads which will sometimes redirect to untrusted URLs that can impact the end user. So, if an app is showing ads that are taken to be high risk apps. So, rate 5 otherwise 0. | Automated Result required further manual evaluation |

-continued

| Security Attribute | Score Value | Methodology for Risk Score Calculation | Automated/ Manual |
|---|---|---|---|
| Two Factor Authentication (2FA) | 0 or 15 | 2FA adds an extra layer of security. So, apps that support Security Assertion Markup Language (SAML) or provide 2FA login facility are considered to be as low risk apps and score 0 otherwise 15. | Manual |
| Overall Risk Score | Out of 100 | This score is based on a dynamic risk scoring engine for web-based content and provide score out of 100. | Manual |
| Exploitable Software | 0 or 15 | Sometimes Apps are using outdated modules, plugins, themes that have known vulnerabilities. So, if an app is using these then it is score 15 otherwise 0. | Fully Automated |
| High Bandwidth | 0 or 15 | This value is calculated based upon the Google lighthouse technique. This checks a web content for more than 68 parameters and checks speed and bandwidth consumption of the app. If the app is getting score <75, it is than rated as 15, otherwise 0 | Fully Automated |
| Anonymous Usage | 0 or 10 | Some apps provide usage without login details or sometimes no login is there. So, these apps rated as 10 otherwise 0 | Manual |
| File Sharing | 0 or 10 | Some apps allow users to upload content and share with anyone. These types of apps are risky for enterprises as users may share company data. So, considering this fact apps involved in these categories is scored 10 otherwise 0 | Manual |
| Streaming Media | 0 or 10 | If an app is found under streaming category, score 10 otherwise 0 | Manual |
| Gaming | 0 or 20 | If an app found under gaming category, it is scored 20 otherwise 0 | Manual |
| Productivity/ Collaboration | 0 or −10 | Apps that help enterprise to enhance its work/ performance are scored as −10 otherwise 0. | Manual |
| Social Networks | 0 or 5 | If the app falls under social network. It poses a risk for the enterprise so it scores as 5 otherwise 0 | Manual |
| Password Strength | 0 or 5 or 10 | Passwords are a crucial part of app security. Passwords that consist of only alphabets [a-z] are scored as 10. Passwords that consist of [a-z and 0-9] are considered to be moderate secure rate as 5. Password that include [a-z and 0-9 and special char] are considered to be secured and rate as 0 | Manual |
| Authentication Type | 0 or 5 or 10 | If the app has no authentication than it is considered to be high risk with a score 10. If there is a normal login functionality it is rated as 5. If authentication is based upon SAML or 2FA etc. It is scored as 0 | Manual |
| Does Scan Attachments | 0 or 15 | If there is an upload functionality in the app and it does not check for malicious upload then it is considered to be risk and scored as 15 otherwise 0. | Manual |
| Send Private Message | 0 or 5 | If a private message sending facility is in the app. it scores as 5 otherwise 0 | Manual |
| File Upload | 0 or 10 | If the app provides a file upload functionality. It scores as 10 otherwise 0 | Manual |
| Remote Access Screen Sharing | 0 or 20 | If the app provides remote sharing or remote access facility. It scores as 20 otherwise 0 | Manual |
| Requests Browser Plugins | 0 or 10 | If the app asks for Push notification while using the app or if it requests to install a plugin to use. It scores as 10 otherwise 0 | Manual |
| Social Plugins | 0 or 5 | Socnet strings that are embedded in the websites and redirect user to social networks are scored as 5 otherwise 0 | Fully Automated |
| Phishing Target | 0 or 10 | If the app is used as a phishing target for spreading malicious content. It is scored as 10 otherwise 0 | Manual |
| Certifications | 0 or −5 | If the App follows compliance and security standards like General Data Protection Regulation (GDPR), Payment Card Industry Data Security Standard)PCI-DSS) etc . . . then it is scored as −5 otherwise 0 | Automated Result required further manual evaluation |
| IP Location | 0 or 10 | If the app serves from the list of blacklisted countries for the cloud-based system. It is scored as 10 otherwise 0 | Fully Automated |

-continued

| Security Attribute | Score Value | Methodology for Risk Score Calculation | Automated/ Manual |
|---|---|---|---|
| Missing or Misconfigured HTTP_Security_Headers | 0 or 5 or 10 | HTTP security headers are an additional layer of security for end users. These are list of main security headers<br>1. X-XSS-Protection.<br>2. X-Frame-Options.<br>3. X-Content-Type-Options.<br>4. Access-Control-Allow-Origin.<br>5. Strict-Transport-Security.<br>6. Public-Key-Pins.<br>7. Content Security Policy<br>If all security headers present are properly configured then score 0<br>If some headers are properly configured then score 5<br>If none of above security headers found then score 10 | Fully Automated |
| HTTP Methods Misconfigured | 0 or 10 | List of harmful HTTP Methods<br>1. PUT<br>2. CONNECT<br>3. PATCH<br>4. OPTIONS<br>5. TRACE etc<br>If HTTP methods are misconfigured or above methods found enabled then score 10 otherwise score 0 | Fully Automated |
| Server Version Discloses | 0 or 10 | If server version information is disclosed then score 10 else score 0 | Fully Automated |
| Cookie Attributes | 0 or 5 or 10 | If cookie attributes are configured properly<br>1. Secure Flag<br>2. HttpOnly flag<br>Cookie attributes protect cookie values from the sniffing both attributes must be enabled<br>If both security attributes are configured properly then score 0<br>If any one of them configured then score 5<br>If both of them not found then score 10 | Fully Automated |
| Security Policy Block | | Check how many policy blocks are there for the App and rate accordingly | Manual |

Process for Evaluating Cloud Application Risk

Figure 9:
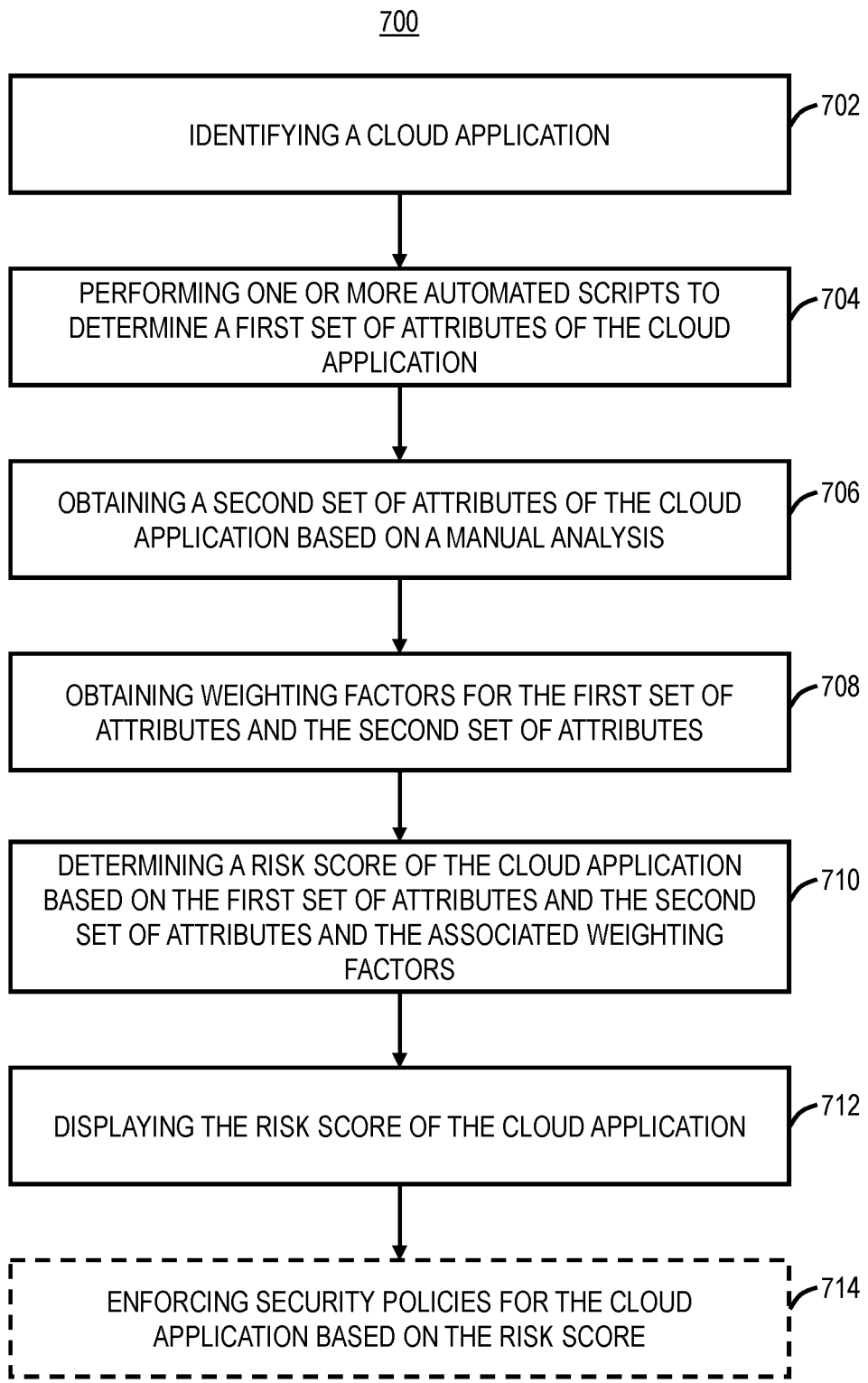

FIG. 9 is a flowchart of a process 700 for determining risk associated with cloud applications, such as via the cloud-based system 100, the CASB 400, and the like. The process 700 can be a computer-implemented method, implemented as instructions stored in a computer-readable medium and executed by one or more processors, or by an apparatus such as the enforcement node 150 or the CASB 400.

The process 700 includes identifying a cloud application (step 702); performing one or more automated scripts to determine a first set of attributes of the cloud application (step 704); obtaining a second set of attributes of the cloud application based on a manual analysis (step 706); obtaining weighting factors for the first set of attributes and the second set of attributes (step 708); determining a risk score of the cloud application based on the first set of attributes and the second set of attributes and the associated weighting factors (step 710); and displaying the risk score of the cloud application (step 712).

The identification of the cloud application can be based on the cloud-based system 100 identifying a new cloud application based on inline monitoring. The process 700 can further include enforcing security policies for the cloud application based on the risk score (step 714). The enforcing can be via one of a cloud-based system and a Cloud Access Security Broker (CASB) system. The enforcing can be one of allowing, blocking, and providing a notification, based on the risk score.

The first set of attributes can be based on a plurality of Secure Sockets Layer (SSL) usage, data sharing, advertisements, exploitable software, bandwidth usage, certifications, Internet Protocol (IP) address location, Hypertext Transfer Protocol (HTTP) configuration, versions, and cookie attributes. The second set of attributes can be based on a plurality of two factor authentication usage, a web-content risk score, login details, file sharing details, Uniform Resource Locator (URL) classification, push notifications, remote sharing, and file upload.

CONCLUSION

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
   identifying a cloud application;
   performing one or more automated scripts to determine a first set of security attributes and a score associated with each security attribute in the first set of security attributes of the cloud application, each of the security attributes in the first set of security attributes being related to characteristics of the cloud application, wherein the first set of security attributes include a version of the cloud application, whether the cloud application includes exploitable software, and whether the cloud application shares with third parties;

obtaining a second set of security attributes and a score associated with each security attribute in the second set of security attributes of the cloud application based on a manual analysis, each of the security attributes in the second set of security attributes being related to characteristics of the cloud application;

obtaining weighting factors for the first set of security attributes and the second set of security attributes;

determining a risk score of the cloud application based on the first set of security attributes and the second set of security attributes and the associated scores and weighting factors; and displaying the risk score of the cloud application and enforcing security policies based on a value of the risk score to automatically prevent malware attacks.

2. The non-transitory computer-readable storage medium of claim 1, wherein the steps further include
enforcing security policies on the cloud application based on the risk score determined for the cloud application.

3. The non-transitory computer-readable storage medium of claim 2, wherein the steps are performed by a cloud-based system operating between the cloud application and users.

4. The non-transitory computer-readable storage medium of claim 2, wherein the enforcing is one of allowing, blocking, and providing a notification, based on the risk score.

5. The non-transitory computer-readable storage medium of claim 1, wherein the first set of security attributes of the cloud application further includes whether the cloud application uses Secure Sockets Layer (SSL), whether the cloud application displays advertisements, bandwidth usage of the cloud application, certifications of the cloud application, Internet Protocol (IP) address location of the cloud application, Hypertext Transfer Protocol (HTTP) configuration of the cloud application, and cookie attributes of the cloud application.

6. The non-transitory computer-readable storage medium of claim 1, wherein the second set of attributes of the cloud application include any of two factor authentication usage, a web-content risk score, login details, file sharing details, Uniform Resource Locator (URL) classification, push notifications, remote sharing, and file upload.

7. The non-transitory computer-readable storage medium of claim 1, wherein
the first set of attributes are based on a plurality of Secure Sockets Layer (SSL) usage, data sharing, advertisements, exploitable software, bandwidth usage, certifications, Internet Protocol (IP) address location, Hypertext Transfer Protocol (HTTP) configuration, versions, and cookie attributes, and
the second set of attributes are based on a plurality of two factor authentication usage, a web-content risk score, login details, file sharing details, Uniform Resource Locator (URL) classification, push notifications, remote sharing, and file upload.

8. A method comprising steps of:
identifying a cloud application;
performing one or more automated scripts to determine a first set of security attributes and a score associated with each security attribute in the first set of security attributes of the cloud application, each of the security attributes in the first set of security attributes being related to characteristics of the cloud application, wherein the first set of security attributes include a version of the cloud application, whether the cloud application includes exploitable software, and whether the cloud application shares with third parties;

obtaining a second set of security attributes and a score associated with each security attribute in the second set of security attributes of the cloud application based on a manual analysis, each of the security attributes in the second set of security attributes being related to characteristics of the cloud application;

obtaining weighting factors for the first set of security attributes and the second set of security attributes;

determining a risk score of the cloud application based on the first set of security attributes and the second set of security attributes and the associated scores and weighting factors; and displaying the risk score of the cloud application and enforcing security policies based on a value of the risk score to automatically prevent malware attacks.

9. The method of claim 8, wherein the steps further include
enforcing security policies on the cloud application based on the risk score determined for the cloud application.

10. The method of claim 9, wherein the steps are performed by a cloud-based system operating between the cloud application and users.

11. The method of claim 9, wherein the enforcing is one of allowing, blocking, and providing a notification, based on the risk score.

12. The method of claim 8, wherein the first set of security attributes of the cloud application further includes whether the cloud application uses Secure Sockets Layer (SSL), whether the cloud application displays advertisements, bandwidth usage of the cloud application, certifications of the cloud application, Internet Protocol (IP) address location of the cloud application, Hypertext Transfer Protocol (HTTP) configuration of the cloud application, and cookie attributes of the cloud application.

13. The method of claim 8, wherein the second set of attributes of the cloud application include any of two factor authentication usage, a web-content risk score, login details, file sharing details, Uniform Resource Locator (URL) classification, push notifications, remote sharing, and file upload.

14. The method of claim 8, wherein
the first set of attributes are based on a plurality of Secure Sockets Layer (SSL) usage, data sharing, advertisements, exploitable software, bandwidth usage, certifications, Internet Protocol (IP) address location, Hypertext Transfer Protocol (HTTP) configuration, versions, and cookie attributes, and
the second set of attributes are based on a plurality of two factor authentication usage, a web-content risk score, login details, file sharing details, Uniform Resource Locator (URL) classification, push notifications, remote sharing, and file upload.

15. A Cloud Access Security Broker (CASB) system comprising:
a controller;
a message broker connected to the controller; and
a plurality of workers each having one or more processors and memory, wherein the plurality of workers are connected to the message broker and connected to one or more cloud providers having a plurality of files contained therein for one or more tenants, wherein one of the plurality of workers is configured to
identify a cloud application;
perform one or more automated scripts to determine a first set of security attributes and a score associated with each security attribute in the first set of security attributes of the cloud application, each of the security attributes in the first set of security attributes being related to characteristics of the cloud application, wherein the first set of security attributes include a version of the cloud application, whether the cloud application includes exploitable software, and whether the cloud application shares with third parties;
obtain a second set of security attributes and a score associated with each security attribute in the second set of security attributes of the cloud application based on a manual analysis, each of the security attributes in the second set of security attributes being related to characteristics of the cloud application;
obtain weighting factors for the first set of security attributes and the second set of security attributes;
determine a risk score of the cloud application based on the first set of security attributes and the second set of security attributes and the associated scores and weighting factors; and
cause display of the risk score of the cloud application and enforce security policies based on a value of the risk score to automatically prevent malware attacks.

16. The CASB system of claim 15, wherein the one of the plurality of workers is configured to
cause enforcement of security policies on the cloud application based on the risk score determined for the cloud application.

17. The CASB system of claim 16, wherein the steps are performed by a cloud-based system operating between the cloud application and users.

18. The CASB system of claim 16, wherein the enforcing is one of allowing, blocking, and providing a notification, based on the risk score.

19. The CASB system of claim 15, wherein the first set of security attributes of the cloud application further includes whether the cloud application uses Secure Sockets Layer (SSL), whether the cloud application displays advertisements, bandwidth usage of the cloud application, certifications of the cloud application, Internet Protocol (IP) address location of the cloud application, Hypertext Transfer Protocol (HTTP) configuration of the cloud application, and cookie attributes of the cloud application.

20. The CASB system of claim 15, wherein the second set of attributes of the cloud application include any of two factor authentication usage, a web-content risk score, login details, file sharing details, Uniform Resource Locator (URL) classification, push notifications, remote sharing, and file upload.

* * * * *